(12) United States Patent
Biancardi

(10) Patent No.: US 8,833,091 B2
(45) Date of Patent: Sep. 16, 2014

(54) DEW EXTRACTING DEVICE

(76) Inventor: Robert P. Biancardi, Crown Point, IN (US)

(*) Notice: Subject to any disclaimer, the term of this patent is extended or adjusted under 35 U.S.C. 154(b) by 339 days.

(21) Appl. No.: 13/280,450

(22) Filed: Oct. 25, 2011

(65) Prior Publication Data

US 2013/0098080 A1   Apr. 25, 2013

(51) Int. Cl.
F25D 17/06 (2006.01)
F25D 17/02 (2006.01)
F25D 21/14 (2006.01)
E03B 3/28 (2006.01)

(52) U.S. Cl.
CPC .................................. *E03B 3/28* (2013.01)
USPC ...................... 62/93; 62/201; 62/285

(58) Field of Classification Search
USPC ............. 62/93, 126, 150, 177, 178, 201, 264, 62/282, 285, 286
See application file for complete search history.

(56) References Cited

U.S. PATENT DOCUMENTS

| | | | |
|---|---|---|---|
| 3,675,442 A * | 7/1972 | Swanson ...................... 62/285 |
| 4,315,599 A | 2/1982 | Biancardi | |
| 4,759,195 A | 7/1988 | Biancardi | |
| 5,106,512 A * | 4/1992 | Reidy ............................ 210/744 |
| 5,878,588 A * | 3/1999 | Biancardi ...................... 62/177 |
| 8,209,994 B1 * | 7/2012 | Headley ......................... 62/285 |
| 2003/0094011 A1 * | 5/2003 | Zakryk et al. ................. 62/291 |
| 2006/0065002 A1 * | 3/2006 | Seoane .......................... 62/291 |

* cited by examiner

*Primary Examiner* — Mohammad M Ali
*Assistant Examiner* — Christopher R Zerphey
(74) *Attorney, Agent, or Firm* — Greer, Burns & Crain Ltd.

(57) ABSTRACT

A method and system for condensing water from ambient air. A dew extracting device with a dew extraction zone having surfaces has the surfaces chilled to below dew temperature for a first period of time. An air moving device directs a flow of air over the chilled surfaces so that liquid water condenses on the surfaces, raising the temperature of the surfaces. The chilling of the surfaces is terminated for a second period of time and liquid water is removed from the surfaces and heat of condensation is removed from the dew extraction zone. Then the process repeats to obtain additional liquid water.

20 Claims, 2 Drawing Sheets

US 8,833,091 B2

DEW EXTRACTING DEVICE

BACKGROUND OF THE INVENTION

The present invention relates to a device, method and control for extracting dew from ambient atmosphere.

Water is present in the ambient atmosphere in the form of moisture and this moisture will condense into droplets onto a surface (dew) when the surface is at or below a certain temperature (based upon relative humidity) referred to as the dew point. As the moisture condenses as dew, it releases a latent heat, that is, it releases energy without a change in temperature. This latent heat, however, must be dissipated or removed or it will cause the surface temperature to rise until it is above the dew point and droplets will no longer form. Further, the excess latent heat could also cause droplets that have already formed to evaporate back into atmospheric moisture.

Devices for extracting water from the atmosphere by cooling a surface to below the dew point are known. For example, such a device is described in applicant's earlier patent, U.S. Pat. No. 4,315,599, the disclosure of which is incorporated herein in its entirety. In that patent, a device, such as a Peltier device is used to continuously cool a surface below dew point to form a collection surface for condensed water droplets. Those condensed droplets are then harvested and utilized.

Other devices, such as air conditioning units include a coil through which a refrigerant flows which has been chilled to a temperature below dew point. Typically a compressor is used to compress the refrigerant, from a gas to a liquid, and then the liquid flows through an evaporator where the temperature of the refrigerant drops as the refrigerant changes state from a liquid to a gas, thereby lowering the temperature of the coil. As air flows over the chilled coil, moisture in the air will condense on the coil. The latent heat released from the water moisture as the moisture condenses into droplets is transferred primarily to the refrigerant which must be cooled again, usually in a condenser to in order for additional moisture to be condensed from the air.

In many parts of the world, fresh liquid water is in short supply, even though there is considerable water available in the atmosphere in such regions. However, the costs involved in running a compressor continuously to dissipate the latent heat released from the moisture as it condenses into droplets are very high and the size and costs of the compressors needed for operating on such a continuous manner are quite large, rendering the possibility of using such systems for obtaining usable amounts of fresh liquid water rather low.

Consequently, it can be seen that the need exists for a system that can extract water from the atmosphere, such as in the form of dew, in reasonable quantities at reasonable costs.

SUMMARY OF THE INVENTION

A method and system for condensing water from ambient air is provided. A dew extracting device with a dew extraction zone having surfaces has the surfaces chilled to below dew temperature for a first period of time. This chilling may be performed with the use of a fluid refrigerant that has been chilled in a reservoir and then circulated through the dew extraction zone. The dew extraction zone may be a serpentine shaped conduit, with or without fins.

An air moving device directs a flow of air over the chilled surfaces so that liquid water condenses on the surfaces, raising the temperature of the surfaces. The chilling of the surfaces is terminated for a second period of time and liquid water is removed from the surfaces and heat of condensation is removed from the dew extraction zone. This second period of time may be measured by the length of time that is required for the temperature of the dew extracting zone to equalize with the ambient temperature. Then the process repeats to obtain additional liquid water.

Other enhancements to the process and system may include shaking the surfaces of the dew extraction zone to increase the removal of the condensed water. Also, a UV light source may be used to prevent growth of bacteria on the dew extraction zone surfaces. Parts or all of the system may be powered through the use of solar or wind generated electrical energy.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DETAILED DESCRIPTION OF THE PREFERRED EMBODIMENTS

Figure 1:
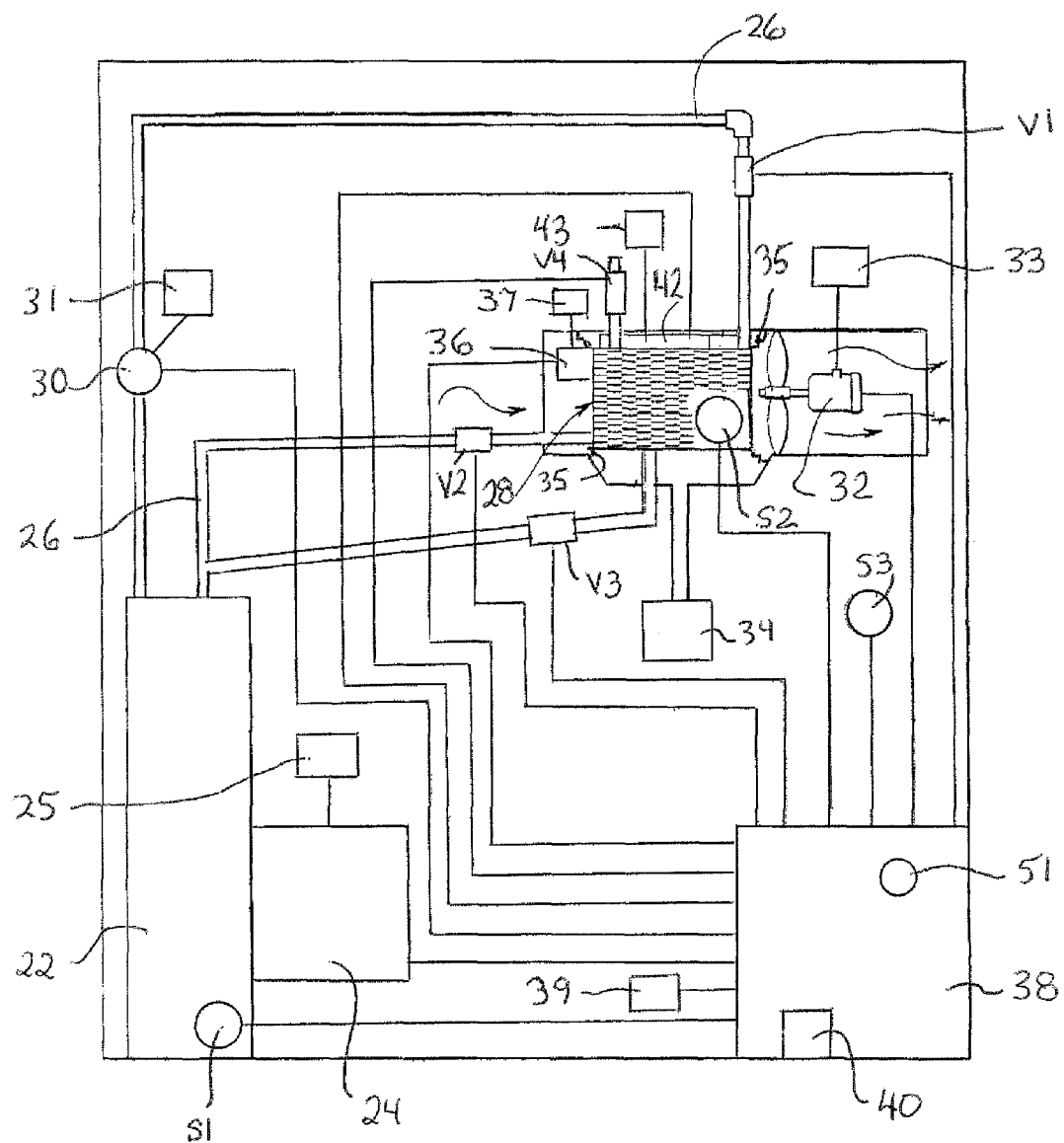
FIG. 1 is a schematic illustration of components of a dew extracting device embodying the principles of the present invention.

A dew extracting device 20 of the present invention as shown schematically in FIG. 1, includes a number of components that are operated in a process to extract dew from the ambient air while reducing the energy required to do so as compared to other devices that cause moisture in the air to condense into droplets.

The dew extracting device 20 includes a reservoir 22, such as a tank that may be insulted, for holding a fluid, such as an antifreeze fluid, or some other type of fluid that is capable of having its temperature lowered to at or near the freezing temperature of water, without freezing. A refrigeration system 24 is arranged to cool the fluid in the reservoir 22. This refrigeration system 24 may be a conventional compressor driven arrangement in which a refrigerant fluid is alternately compressed, cooled and evaporated to reduce the temperature of the fluid, and then a suitable heat exchanger is provided to absorb heat from the fluid in the reservoir (which is a different fluid from the fluid of the refrigeration system). Other known types of refrigeration systems may also be used that can effect a chilling of the fluid in the reservoir.

The refrigeration system 24 may be powered by a power source 25 such as electricity which may be generated by solar cells or wind power systems in areas where desired, such as when distributed electrical power is not readily available, or simply to operate the refrigeration system without relying on grid power.

A first temperature sensor S1 is associated with the fluid in the reservoir 22. This temperature sensor S1 may be a thermocouple mounted directly to a wall of the reservoir 22 or other type of sensor that can measure a value for the temperature.

A conduit 26 leads from the reservoir 22 to a dew extraction zone 28. The dew extraction zone 28 may include a continuation of the conduit 26 in a coil or serpentine configuration to provide a relatively large surface area in the dew extraction zone 28 that may be cooled by the fluid flowing through the conduit 26. There may be provided fins or other surface area enhancing features on the conduit 26 in the dew extracting zone 28 in addition to or in lieu of a bending or other orientation changing feature of the conduit 26 in the dew extraction zone 28. In all instances, the surface areas in the dew extraction zone 28 will be in thermal communication with the fluid flowing through the conduit 26.

A pump 30 is arranged to move the fluid from the reservoir 22 to the dew extraction zone 28. Any of numerous types of pumps may be used for the pump 30, including diaphragm pumps, positive displacement pumps, peristaltic pumps, centrifugal pumps, and other types of pumps. The pump 30 may be powered by a power source 31 such as electricity which may be generated by solar cells or wind power systems in areas where desired, such as when distributed electrical power is not readily available, or simply to operate the pump without relying on grid power. The fluid is caused to flow from the reservoir 22 through the dew extraction zone 28 and then to continue through the conduit 26 to return to the reservoir 22. A first normally open valve V1 may be provided between the reservoir 22 and the dew extraction zone 28 on the upstream side of the dew extraction zone 28. A second normally open valve V2 may be provided in the conduit 26 between the dew extraction zone 28 and the reservoir 22, on the downstream side of the dew extraction zone 28. Although the reservoir 22 is schematically illustrated as being positioned below or lower than the dew extraction zone 28, it could also be positioned at the same level as the dew extraction zone or even above the dew extraction zone, with appropriate placement of the pump 30 relative to the reservoir 22 and the dew extraction zone 28 to cause a recirculation of the fluid through the conduit 26 as discussed.

A second temperature sensor S2 is associated with the dew extraction zone 28. This second temperature sensor S2 may be a thermocouple or other type of temperature sensor that is mounted directly to a surface in the dew extraction zone 28, or other mounting arrangement such that it can measure a temperature on or near the surface in the dew extraction zone 28.

A third temperature sensor S3 is associated with the ambient atmosphere. Again this third temperature sensor S3 may be a thermocouple or other type of temperature sensor that is mounted to measure a temperature of the ambient atmosphere.

An air moving device 32 such as a fan is arranged to direct a flow of ambient air through the dew extraction zone 28. Any type of device, such as a squirrel cage blower, a bladed fan, or other air moving device may be used in order to cause a flow of ambient air to pass over the surfaces of the dew extraction zone 28 when the air moving device is energized. The air moving device 32 may be powered by a power source 33 such as electricity which may be generated by solar cells or wind power systems in areas where desired, such as when distributed electrical power is not readily available, or simply to operate the air moving device without relying on grid power.

A collection container 34 is arranged to communicate with the dew extraction zone 28, such as by its physical placement or via a conduit or funnel, so that it is arranged to receive condensed water droplets from the dew extraction zone 28. For example, the collection container 34 may be placed below the dew extraction zone 28 and the water droplets may fall into the collection container 34 from the dew extraction zone 28 by operation of gravity.

Optionally, a vibrating mechanism 36 may be provided to induce a shaking or vibrating movement to the surfaces of the dew extracting zone 28 to enhance the removal of condensed water vapor from those surfaces. A number of different types of mechanisms may be employed as the vibrating mechanism 36 including a rotary shaft with an eccentric weight, a reciprocating plunger, or other well known vibration inducing mechanisms. The surfaces of the dew extraction zone 28, such as a serpentine coil, with or without fins, may be mounted to permit or enhance shaking or vibrational movement, such as by mounting on resilient members 35, for example springs or rubber grommets. The vibrating mechanism 36 may be powered by a power source 37 such as electricity which may be generated by solar cells or wind power systems in areas where desired, such as when distributed electrical power is not readily available, or simply to operate the vibrating mechanism without relying on grid power.

A controller 38 is provided for operating the various components of the dew extracting device in accordance with a process embodying the principles of the present invention. The controller 38 is arranged to be in controlling communication, as shown schematically with unnumbered control lines, with the refrigeration system 24, the pump 30 and the air moving device 32 in part based on signals from the various temperature sensors S1, S2 and S3 as described below. The controller 36 also includes a timer 40 to be used at various steps in the dew extracting process. If a vibrating mechanism 36 is employed, its operation may also be controlled by the controller 38. As an example, the controller 38 may include a programmable logic control to operation the system through the various steps described herein. Other types of controllers could also be used.

The controller 38 may be powered by a power source 39 such as electricity which may be generated by solar cells or wind power systems in areas where desired, such as when distributed electrical power is not readily available, or simply to operate the controller without relying on grid power. This power source 39 may be the single power source for all of the powered equipment, with power provided through the control lines, rather than separate power sources for each piece of equipment as schematically illustrated.

Another optional feature is a UV light source 42 which may be located in the dew extraction zone 28 to minimize, reduce or remove any bacteria on the surfaces of the dew extraction zone 28. The UV light source 42 could be arranged to irradiate the surfaces of the dew extraction zone 28. Alternately, the UV light source 42 could be positioned to irradiate collected condensate as it passes from the dew extraction zone 28 into the collection container 34, or once the condensate is located in the collection container. The UV light source 42 may be powered by a power source 43 such as electricity which may be generated by solar cells or wind power systems in areas where desired, such as when distributed electrical power is not readily available, or simply to operate the UV light source without relying on grid power. Operation of the UV light source 42 may be controlled by the controller 38.

The various power sources 25, 31, 33, 37, 39, 43 may originate from the same source, or may have different sources. If different voltages are required for operation of various components by the various power sources, then appropriate transformers and other conventional circuit elements may be used.

Figure 2:
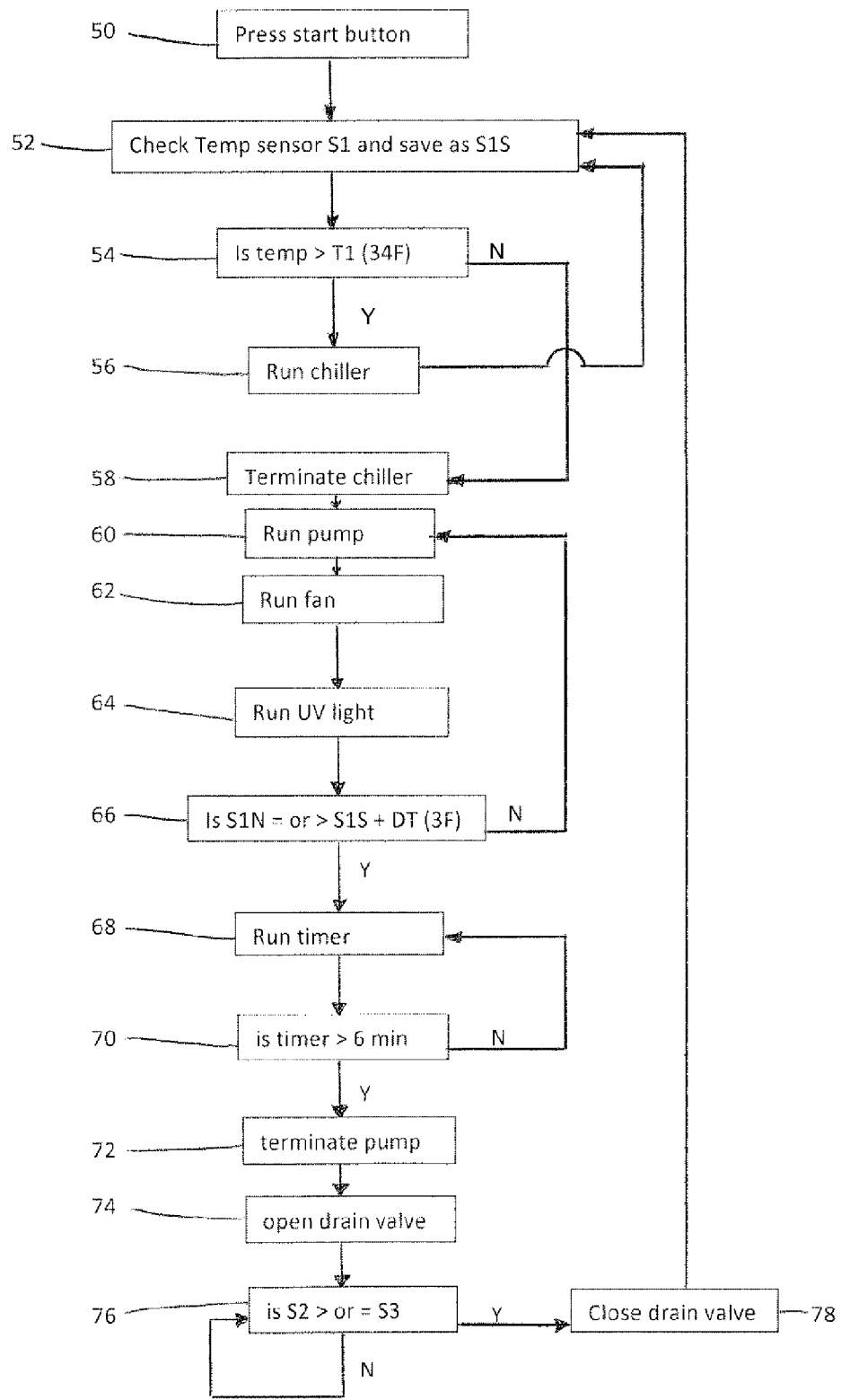
FIG. 2 is a schematic flow chart of the steps undertaken in a process of operation a dew extracting device according to the principles of the present invention.

The process of operating the dew extracting device 20 in accordance with the principles of the present invention is shown in the flow chart of FIG. 2 and is described below.

In step 50 a user begins the dew harvesting cycle by pressing a power button or power switch 51 that may be contained on a panel of the controller 38. In step 52, the control checks temperature sensor S1 and saves the value as S1S. In step 54, the control determines whether S1S is greater than a predetermined value T1. T1 is a temperature which is equal to or below the dew point temperature at the time and location of operation of the dew extracting device 20. This temperature may be determined and manually or automatically adjusted each time the dew extracting device 20 is operated, or changed while the dew extracting device is being operated. Alternatively, a predetermined temperature, likely to nearly always be below the dew point temperature, such as 34° F., may be input or preset as T1. If S1S is above T1, then the process moves to step 56 where the refrigeration system 24 is run to chill the fluid in the reservoir 22. Then the process returns to step 52 to check sensor S1 and to reset the value of S1S. This control loop continues until in step 54, the value of S1S is equal to or below T1. When the value T1 is reached, the process moves to step 58 where operation of the refrigeration system 24 is terminated, removing the power consumption associated with the refrigeration system 24.

The process next moves to step 60 in which the pump 30 begins operation and then step 62 in which the air moving device 32 begins operation. The pump 30 circulates chilled fluid from the reservoir 22 to the dew extraction zone 28 through the conduit 26, and then back to the reservoir. The fluid passes through the normally open valve V1 before entering the dew extraction zone 28 and the normally open valve V2 after departing the dew extraction zone 28 and continues through the conduit 26 to the reservoir 22. The air moving device 32 causes a flow of ambient air through the dew extraction zone 28 so that a continuous supply of air with ambient moisture content is presented to the chilled surfaces of the dew extraction zone 28. Since the surfaces of the dew extraction zone 28 are cooled below the dew point temperature, moisture in the air will condense on the surfaces as droplets, releasing energy in the form of heat of condensation, warming the water droplets and the surfaces of the dew extraction zone. Some of the heat given off during condensation will be absorbed by the fluid flowing through the dew extraction zone 28.

Optionally the process includes step 64 which includes operating the UV light source 42 in the dew extraction zone 28 (or wherever it is located) to minimize, reduce or remove any bacteria on the surfaces of the dew extraction zone 28.

Regardless of the inclusion of step 64, the process then continues to step 66 where the value for sensor S1 is checked to determine whether it senses a temperature of the recirculating fluid in the reservoir 22 which has increased above the temperature saved as S1S, the initial starting temperature by some predetermined amount DT, such as 1° F. If this temperature rise has not yet been detected, then the process returns to steps 60 to 66 so that the pump 30 continues to run, the air moving device 32 continues to run and the temperature of the recirculating fluid is rechecked. Once the temperature rise DT is detected, then the process moves to step 68 where the timer 40 is started.

The process moves to step 70 to determine whether a set time period T2, such as 6 minutes, has elapsed. During the period until T2 has been achieved, moisture will continue to condense on the surfaces of the dew extraction zone, releasing additional heat of condensation. If the time period T2 has not elapsed, the process loops back to step 68 to continue running the timer 40 and the step 70 to recheck the elapsed time. Once this time period T2 has elapsed, then the process moves to step 72 where operation of the pump 30 may be terminated (but air moving device 32 remains energized) and then step 74 where a drain valve V3 for the dew extraction zone 28 is opened. At this same time, the first valve V1 and the second valve V2 may be closed. A vacuum break valve V4 is opened to allow for full drainage of the fluid from the dew extraction zone 28 back into the reservoir 22.

Once the drain valve V3 is opened, the process moves to step 76 where the value of the dew extraction zone temperature sensor S2 is continuously compared to the value of the ambient temperature sensor S3. During this period, the heat absorbing capacity of the ambient air is used to absorb the excess heat of condensation that was not yet absorbed into the recirculating fluid. Once the detected temperature of the dew extraction zone 28 is approximately equal to the ambient temperature, then the process moves to step 78 where the drain valve V3 and the vacuum break valve V4 are closed and the first valve V1 and the second valve V2 are opened. At this point, all of the excess heat of condensation will have been removed from the dew extraction zone 28, thereby assuring that this excess heat load would not be transferred to the recirculating fluid.

The process then returns to step 52 where the temperature sensor S1 in the reservoir 22 is checked and its value is saved as S1S and the steps of the process repeat as described above.

An optional step that may be used to increase the amount of dew harvested is to operate the vibrating mechanism 36 that shakes the surfaces of the dew extraction zone 28 while or after dew is condensing on those surfaces. This vibrating mechanism 36 may begin operation at the same time, or after the pump 30 begins to recirculate the chilled fluid through the dew extraction zone 28 in step 60. The vibrating mechanism 36 may continue operation until the pump 30 is deenergized in step 72 or even until the drain valve V3 is closed in step 78, or some time in between.

The entire operation may be terminated at any time by the user pressing the power button or switch 51 at the control panel.

The value of the present apparatus and process is that the latent heat given off by the dew as it condenses in the dew extraction zone 28 is only partially absorbed by the chilled fluid, such as by the temperature rise measured in step 66 and additional temperature rise during the operation of the timer 40 in step 68. After this, the chilled fluid is returned to and retained in the reservoir 22 while the remaining latent heat is dissipated into the ambient atmosphere since the fan 32 continues to run to direct an ambient air stream over the dew extraction zone 28 until the temperature of the dew extraction zone 28 returns to the ambient temperature. Removal of the condensed water from the surfaces of the dew extraction zone 28 will also serve to remove the energy absorbed in that water as additional water droplets condense.

Although a specific arrangement of components and steps for the use and operation of those components is described above with respect to a particular embodiment of the invention, not all of the components arranged in the manner described are required for the present invention. For example, although the chilling of a refrigerant fluid is shown and described, other arrangements for chilling the dew extracting zone could be utilized, such as by a direct use of the refrigeration system 24, rather than through the medium of the fluid refrigerant, or by other chilling mechanisms, such as described in applicant's earlier patent, U.S. Pat. No. 4,315, 599. Other specific use and arrangements of conduits, valves and controls for the various components of the chilling system can likewise be modified from the specific embodiment shown and described. Various modifications to the timing of certain events, such as the starting and stopping of the pumping of the refrigerant fluid, the start of the air moving device 32, the start and stop of the optional vibrating mechanism 36 could be made to start or stop such operations at different times, so long as the principles of the present invention are maintained.

A more general description of a method embodying the present invention of condensing water from ambient air using a dew extracting device with a dew extraction zone having surfaces includes the steps of:

chilling surfaces in the dew extraction zone to below dew temperature for a first period of time, flowing air over the chilled surfaces so that liquid water condenses on the surfaces, raising the temperature of the surfaces, terminating the chilling of the surfaces for a second period of time and removing liquid water from the surfaces and heat of condensation from the dew extraction zone, and repeating the foregoing steps.

Thus, the advantage of the present invention is to stop chilling the dew extraction zone at various times during the dew extraction process so that heat of condensation given up by the water as it condenses can be removed from the dew extraction zone before that heat is absorbed by the chilling medium, such as the fluid refrigerant. Some of this heat of condensation is present in the condensed water on the surfaces of the dew extraction zone, so as this water is removed, the heat of condensation is removed with it. Some of this heat of condensation also raises the temperature of the dew extraction zone surfaces, so before that heat is fully conducted into the chilling medium, the chilling is terminated and this heat is removed, during the second period of time, such as by continuing to flow ambient air through the dew extraction zone. As an example, the chilling process can be paused for a period of time until the temperature in the dew extraction zone returns to the ambient temperature. In this manner it will be assured that all of the heat of condensation will be removed before the chilling process is resumed.

In a system for extracting liquid water from the air according to the principles of the present invention, there is a dew extraction zone having surfaces, a controller, a chilling mechanism operated by the control to chill the surfaces in the dew extraction zone to below dew temperature for a first period of time, an air moving device operated by the control and arranged to flow air over the chilled surfaces so that liquid water condenses on the surfaces, raising the temperature of the surfaces, with the controller arranged to terminate operation of the chilling mechanism for a second period of time after liquid water condenses on the surfaces to allow for heat of condensation to be removed from the dew extraction zone and then to resume operation of the chilling mechanism for the first period of time and to continue the cycle of chilling and termination of chilling.

Applicant has had some calculations made of the process described herein as compared to all of the heat of condensation being absorbed by the chilling fluid. In ambient air at 80° F. and 65% relative humidity, and with using a 4 gallon supply of refrigerant fluid cooled to 34° F., it was calculated that 252.1 BTUs of energy would be released by the condensing water to obtain 2 ounces of water. In an experiment, applicant determined that to obtain 2 ounces of condensed water resulted in a temperature rise of the 4 gallons of refrigerant fluid of 1° F., which represents an energy increase of only 33.3 BTUs. Therefore, 218.8 BTUs of energy from the heat of condensation, or 84.8% of the total heat released was dissipated other than into the refrigerant fluid. As compared to a system where all of the energy from the heat of condensation is absorbed into the chilling medium, this is a savings of 84.8%, translating into a significantly lower energy cost to extract liquid water from the ambient air over such a system.

By adjusting the length of time that the pump continues to recirculate the chilled fluid and the length of time that the pump operation is terminated in each cycle, the percent of the total heat of condensation released that is absorbed by the air flowing over the surfaces of the dew extraction device or removed by removing the condensed water from the surfaces of the dew extraction device can be adjusted. It is preferred that at least 50% of the heat of condensation is removed from the dew extraction device via the ambient air or the removed condensed water and not through the chilled fluid. It is more preferred that at least 60% of the heat of condensation is removed from the dew extraction device via the ambient air or the removed condensed water and not through the chilled fluid. It is most preferred that at least 75% of the heat of condensation is removed from the dew extraction device via the ambient air or the removed condensed water and not through the chilled fluid.

The reduced energy requirement for the present system allows a device embodying the principles of the present invention to be used in locations having limited energy supplies and locations where only solar or wind power might be available. Also, the cost of operating a system, based on a unit of recovered liquid water, would be substantially lower than the cost for operating a system where all of the heat of condensation is absorbed into the chilling medium.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method of condensing water from ambient air using a dew extracting device with a dew extraction zone having surfaces comprising the steps:

chilling surfaces in the dew extraction zone with a fluid refrigerant to below dew temperature for a first period of time, flowing air over the chilled surfaces so that liquid water condenses on the surfaces, raising the temperature of the surfaces, terminating the chilling of the surfaces and removing all of the fluid refrigerant from the dew extraction zone for a second period of time and removing liquid water from the surfaces and heat of condensation from the dew extraction zone during said second period of time, and repeating the foregoing steps.

2. The method according to claim 1, wherein the surfaces in the dew extraction zone are chilled by recirculating the fluid refrigerant through a conduit in thermal communication with the surfaces.

3. The method according to claim 1, wherein air is flowed over the chilled surfaces by operation of an air moving device.

4. The method according to claim 1, wherein liquid water is removed from the surfaces by operation of gravity.

5. The method according to claim 4, including the step of shaking the surfaces to dislodge water condensed on those surfaces.

6. A system for extracting liquid water from the air comprising:

a dew extraction zone having surfaces, a controller, a chilling mechanism operated by the controller to chill the surfaces in the dew extraction zone with a fluid refrigerant to below dew temperature for a first period of time, an air moving device operated by the controller and arranged to flow air over the chilled surfaces so that liquid water condenses on the surfaces, raising the temperature of the surfaces, the controller configured to terminate operation of the chilling mechanism and to remove all of the fluid refrigerant from the dew extraction zone for a second period of time after liquid water condenses on the surfaces, thereafter removing said condensed liquid water from the surfaces; and then to resume operation of the chilling mechanism for the first period of time and to continue the cycle of chilling and termination of chilling.

7. The system according to claim 6, wherein the chilling mechanism includes a refrigeration system for chilling the fluid refrigerant and a pump for recirculating the fluid refrigerant through the dew extraction zone.

8. The system according to claim 6, wherein the controller comprises temperature sensors and timers for detecting the temperature in the dew extraction zone and for measuring at least one of the first period of time and the second period of time.

9. A method of condensing water from ambient air using a dew extracting device with a dew extraction zone having surfaces comprising the steps:
chilling surfaces in the dew extraction zone with a fluid refrigerant to below dew temperature,
flowing air over the chilled surfaces so that liquid water condenses on the surfaces, releasing heat of condensation,
terminating the chilling of the surfaces and removing all of the fluid refrigerant from the dew extraction zone,
thereafter removing condensed liquid water from the surfaces and continuing to flow air over the surfaces in the dew extraction zone to absorb at least some of the released heat of condensation, and
resuming the chilling of the surfaces and repeating the foregoing steps.

10. The method according to claim 9, wherein at least 50% of the released heat of condensation is removed from the dew extraction zone by the removal of condensed liquid water from the surfaces and from the flow of air over the surfaces.

11. The method according to claim 9, wherein at least 75% of the released heat of condensation is removed from the dew extraction zone by the removal of condensed liquid water from the surfaces and from the flow of air over the surfaces.

12. A method for extracting liquid water from the air comprising the steps:
chilling a refrigerant fluid to a first temperature that is below an ambient dew point temperature and then terminating the chilling operation,
circulating the refrigerant fluid through a dew extraction zone to cool surfaces in the dew extraction zone to below ambient dew point temperature,
operating an air moving device to move ambient air through the dew extraction zone,
measuring a temperature rise in the refrigerant fluid until a predetermined rise is detected,
continuing to circulate the refrigerant fluid through the dew extraction zone for a first period of time after the predetermined temperature rise is detected,
removing all refrigerant fluid from the dew extraction zone after the first period of time, rechilling the refrigerant fluid to the first temperature and then terminating the chilling operation,
removing condensed liquid water from the surfaces in the dew extraction zone to collect the condensed liquid water and to remove heat of condensation absorbed by the condensed liquid water from the dew extraction zone,
comparing a temperature in the dew extraction zone with an ambient atmospheric temperature after the refrigerant fluid is removed from the dew extraction zone and once the temperature in the dew extraction zone is substantially equal to the ambient atmospheric temperature, resuming the circulation of the refrigerant fluid through the dew extracting zone and repeating the foregoing steps following the circulating the refrigerant fluid.

13. A method according to claim 12, wherein the step of chilling the refrigerant fluid is accomplished using a compressor, a condenser and an evaporator.

14. The method according to claim 12, wherein liquid water is removed from the surfaces by operation of gravity.

15. The method according to claim 14, including the step of shaking the surfaces to dislodge water condensed on those surfaces.

16. A system for extracting liquid water from the air comprising:
a reservoir for holding a fluid,
a refrigeration system arranged to cool the fluid in the reservoir,
a temperature sensor associated with the fluid in the reservoir,
a conduit leading from the reservoir to a dew extraction zone,
a pump arranged to move the fluid from the reservoir to the dew extraction zone,
a temperature sensor associated with the dew extraction zone,
a fan arranged to direct a flow of ambient air through the dew extraction zone,
a collection container communicating with the dew extraction zone and arranged to receive condensed water droplets from the dew extraction zone,
a controller including a timer configured to operate the refrigeration system, the pump and the fan in part based on signals from the temperature sensor associated with the fluid in the reservoir and the temperature sensor associated with the dew extraction zone,
wherein the controller is configured to operate the refrigeration system during a first time period to cool the fluid in the reservoir to a first temperature below dew point at which time the operation of the refrigeration system is terminated and the pump is operated to move the chilled fluid from the reservoir through the conduit to the dew extraction zone for a second time period until the temperature sensor associated with the fluid detects a first predetermined temperature rise in the fluid, and then continues to operate the pump to continue to recirculate the fluid between the reservoir and the dew extraction zone for a third time period at which point the operation of the pump is terminated and all of the fluid returns to the reservoir for a fourth time period while the refrigeration system is operated until the temperature of the fluid in the reservoir is reduced to the first temperature again and the temperature of the dew extraction zone is substantially equated to ambient temperature, at which time the operation of the refrigeration system is terminated again and the cycle repeats as in the second through fourth time periods.

17. The system according to claim 16, wherein the refrigeration system comprises a compressor, an evaporator and a condenser.

18. The system according to claim 16, wherein the dew extraction zone comprises a conduit for carrying the fluid cooled by the refrigeration system and fins on the conduit to increase a surface area in the dew extraction zone.

19. The system according to claim 18, including a vibrating mechanism associated with the conduit in the dew extraction zone to shake the conduit when activated.

20. The system according to claim 16, including a source of UV radiation positioned in the dew extraction zone to irradiate at least some of the condensed water droplets.

* * * * *